United States Patent [19]

Sroka

[11] Patent Number: 5,570,531
[45] Date of Patent: Nov. 5, 1996

[54] WIND ACTIVATED DECOY HEAD AND NECK

[76] Inventor: Thomas A. Sroka, 124 Prospect Ave., Redgranite, Wis. 54970

[21] Appl. No.: 402,201

[22] Filed: Mar. 10, 1995

Related U.S. Application Data

[63] Continuation-in-part of Ser. No. 258,275, Jun. 10, 1994, abandoned.

[51] Int. Cl.⁶ ............................................. A01M 31/06
[52] U.S. Cl. ............................................................ 43/3
[58] Field of Search ............................................ 43/1, 2, 3

[56] References Cited

U.S. PATENT DOCUMENTS

| | | | |
|---|---|---|---|
| 1,616,006 | 2/1927 | Sinibaldi | 43/3 |
| 2,185,013 | 12/1939 | Bonetti | 43/3 |
| 2,719,376 | 10/1955 | Risch | 43/3 |
| 2,746,195 | 5/1956 | Renwick | 43/3 |
| 5,136,800 | 8/1992 | Lanius | 43/2 |
| 5,279,063 | 1/1994 | Heises | 43/3 |

FOREIGN PATENT DOCUMENTS

| | | | |
|---|---|---|---|
| 0712760 | 7/1965 | Canada | 43/3 |

*Primary Examiner*—Joseph J. Hail, III
*Assistant Examiner*—James Miner
*Attorney, Agent, or Firm*—Donald Cayen

[57] ABSTRACT

A decoy has a body, a head and neck, and a flexible connector interposed between the body and the head and neck. In one embodiment, a base is joined to the decoy body. One end of the flexible connector is inserted into the base, and a second end is inserted into the head and neck. The connector bends under wind forces acting on the head and neck and thereby imparts movements of the head and neck relative to the body. The flexible connector can be inserted at different depths into the head and neck to suit different wind conditions. In an alternate embodiment, the flexible connector is generally L-shaped, having a first end fastened directly to the decoy body and a second leg that is inserted into the head and neck.

18 Claims, 4 Drawing Sheets

WIND ACTIVATED DECOY HEAD AND NECK

This is a continuation-in-part of U.S. patent application Ser. No. 08/258,275 filed on Jun. 10, 1994, now abandoned.

TECHNICAL FIELD

The present invention relates in general to decoys suitable for hunters' use in attracting birds. Specifically, the present invention relates to the inclusion of wind activated motion in a decoy neck and head to assist in a more lifelike presentation of the decoy.

BACKGROUND ART

Hunters of waterfowl have consistently used decoys to attract their prey. The decoys have been those that float in water, sit or stand in fields, or are mounted on poles. The decoys have been made of wood, plastic, or cloth. The majority of prior decoys have been comprised of one or more components in which the head and neck remain in a fixed position relative to the decoy body.

The prior decoys, while possessing the physical characteristics of a bird, do not possess the motions normally associated with a live bird, such as a feeding goose. It is a well known fact among waterfowl hunters that motion in conjunction with decoys proves to be more effective in attracting the prey than decoys without any motion.

There are a number of patents pertaining to movements in decoys. U.S. Pat. No. 4,611,421 shows a goose decoy that includes resilient strips that support the neck and back. The strips flex during changes in wind pressure to give movement to the decoy neck and body. Since the neck and body move together, the decoy movements are stiff and unrealistic in appearance.

U.S. Pat. No. 4,852,288 discloses a game decoy in which a neck is pivotally connected to a body. Rubber bands between the neck and body hold the neck at a nominal location. Wind forces on the neck and head stretch one of the rubber bands and cause the neck and head to oscillate relative to the body. The movements of the head and neck are not controllable to suit different wind speeds except by changing the rubber bands.

U.S. Pat. No. 5,279,063 discloses a decoy with a flexible neck that can be manually reconfigured. The neck remains at the selected configuration after that configuration has been set. The neck is held to an insert that in turn is pivotally connected to the decoy body. Friction between the insert and the body enables the insert to be manually pivoted to a selected orientation relative to the body. The friction retains the insert and thus the neck at the selected orientation. Although the neck can be initially set in a number of different configurations and angular orientations, the neck remains in the set position, it does not move in the wind.

BRIEF DISCLOSURE OF THE INVENTION

The present invention is distinguished over the prior art in general and the aforementioned patents in particular by having a wind activated, articulating, one-piece decoy head and neck formed of light weight material and connected to a decoy body by a flexible connector. The head and neck are comprised of a light weight material to allow motion to occur in the presence of a slight breeze when affixed with the connector, which is of a material with sufficient flexibility to bend.

The preferred embodiment of the present invention has a base interposed between the head and neck and an existing decoy body. The base is manufactured from a material that is water resistant and has the ability to be formed into a shape that is capable of joining to the existing decoy body. The head and neck is manufactured from a light weight, water resistant material. The head and neck is connected to the base by the flexible connector. One end of the connector is inserted into the base. Another end of the connector is inserted into a slot in the head and neck. The connector is capable of undergoing repeated flexing without breaking or loosing its flexibility. The connector has sufficient stiffness to hold the head and neck upright, but also sufficient flexibility to enable the head and neck to bend the connector and thus tilt the head and neck back and forth in a breeze.

Further in accordance with the present invention, the flexibility of the connector and thus the movement of the decoy head and neck is adjustable to suit different wind conditions. Different flexibilities are achieved by inserting the connector second end at different distances into the slot in the head and neck. In light breezes, the connector is inserted only a short distance into the head and neck slot. In that situation, very little wind is required to bend the connector and thus move the head and neck. In strong winds, the connector second end is inserted for the full depth of the head and neck slot. In that situation, the head and neck is not overpowered by the wind. Friction retains the connector second end at the proper location relative to the head and neck slot.

In an alternate embodiment, the connector has an L-shape. One leg of the connector is fastened directly to the decoy body. The lower end of the head and neck has a slot that receives the connector second leg. The direct connection between the body and the head and neck is especially useful with decoy bodies that do not have a hole in them for receiving a head and neck. The operation of the alternate embodiment is identical to that of the design that uses the intermediate base.

An object of this invention is to provide realistic motion of the heads and necks of decoys both in very light breezes and in heavy winds.

Another object of this invention is to provide motion in the heads and necks of decoys without manual intervention by the hunter.

In addition to displaying a lifelike presentation, this invention also frees the hands of the hunters to either call in their prey or to retain safe control of their guns.

The method and apparatus of the invention, using a base and a flexible connector to connect a decoy head and neck to a decoy body, thus produces realistic movements of the head and neck. The flexibility of the connector can be adjusted to suit different wind conditions.

Other advantages, benefits, and features of the present invention will become apparent to those skilled in the art upon reading the detailed description of the invention.

DETAILED DESCRIPTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
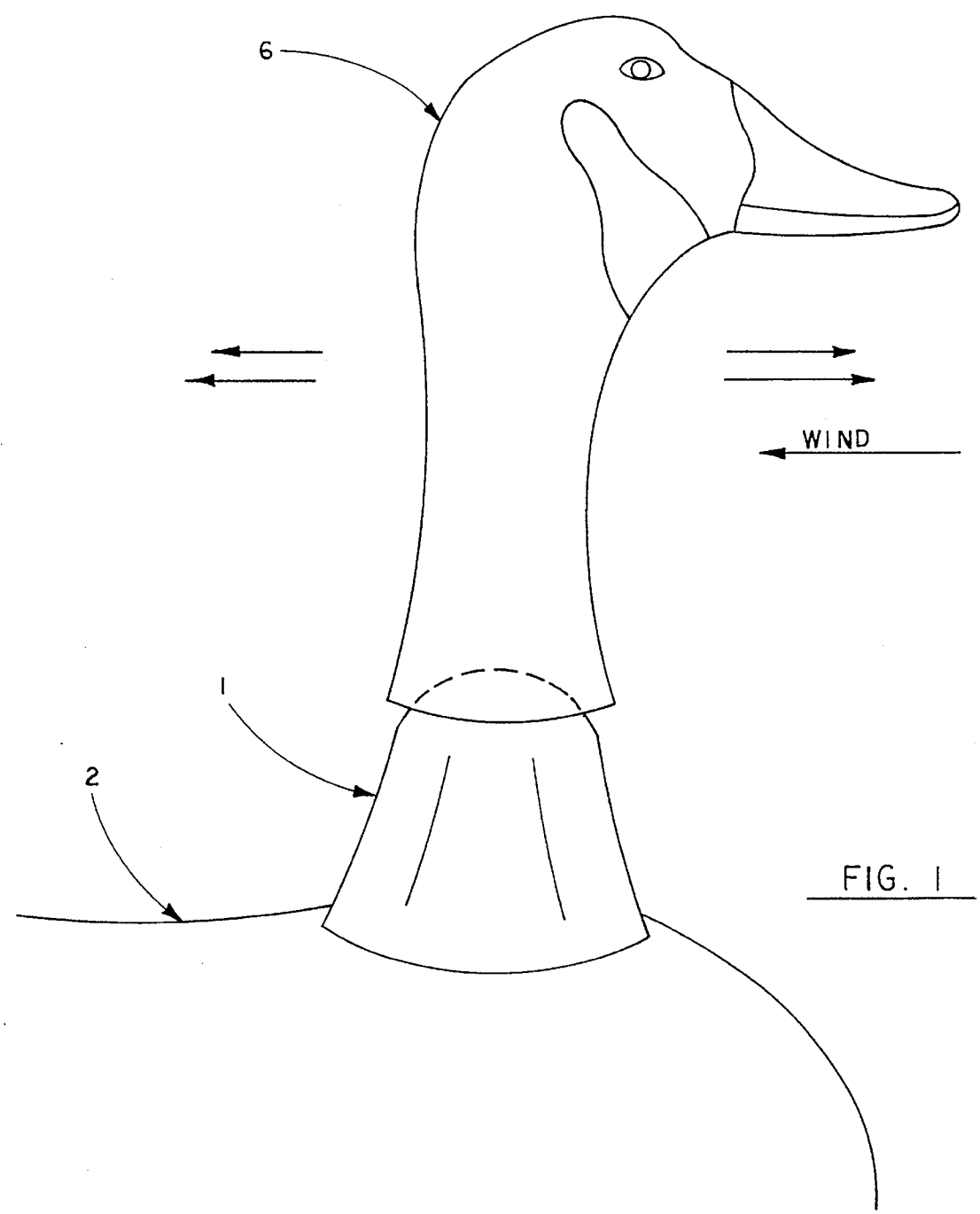
FIG. 1 is a perspective view of the preferred embodiment of a sentry style head and neck of this invention as a part of a completed decoy.
Figure 2:
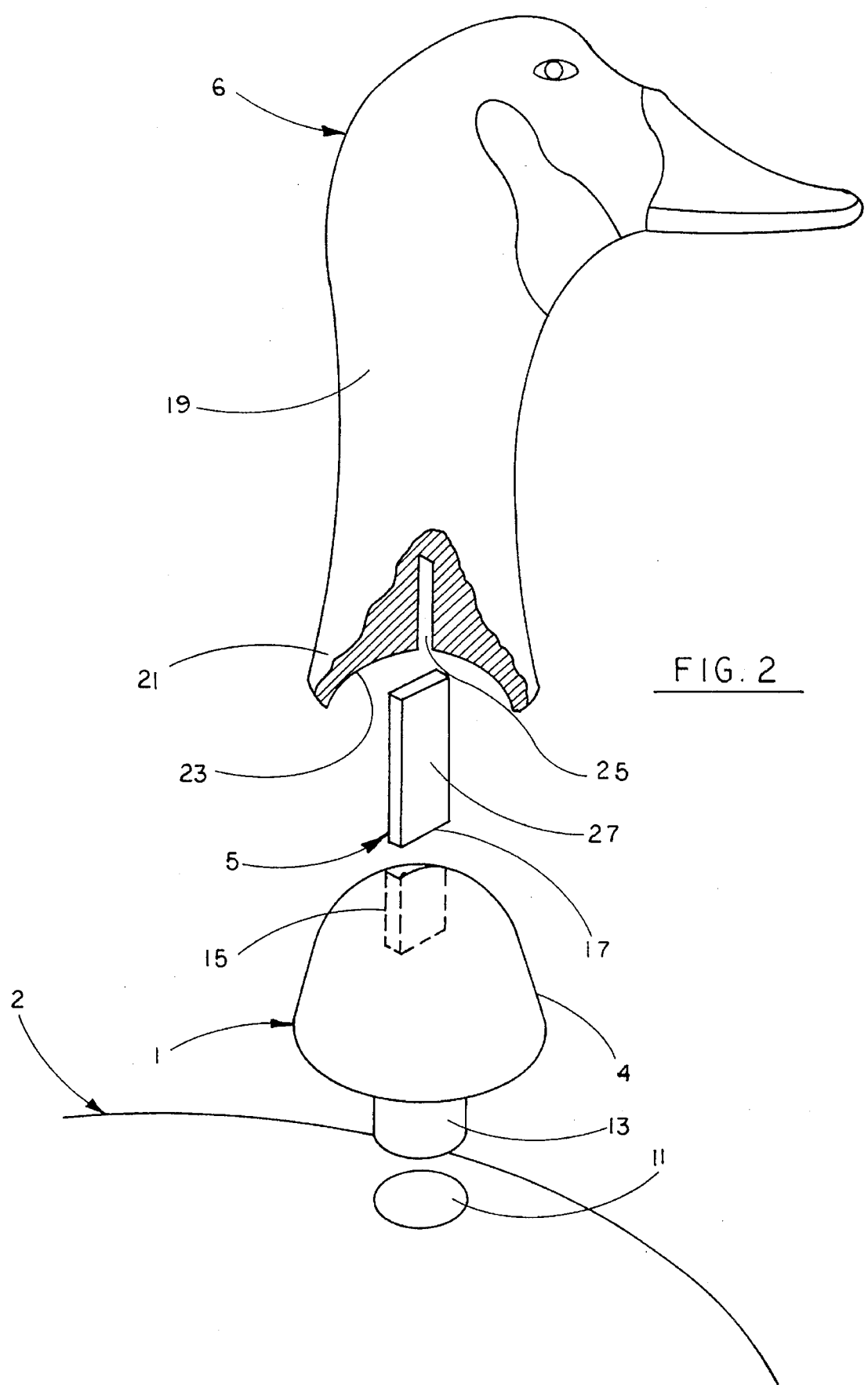
FIG. 2 is a perspective view of the components of the invention, some of which are shown partially broken, disassembled from the decoy body.

Referring to FIGS. 1 and 2, reference numeral 2 represents the body of a conventional multi-piece bird decoy. Such decoy bodies can be of numerous sizes, shapes, and colors and are well known in the art. The body 2 has a hole 11 for receiving the lower end of a neck in conventional decoys.

In accordance with the present invention, a base 1 is joined to the decoy body 2. For that purpose, the base 1 has a cylindrical first end 13 that fits snugly into the body hole 11. The second end 4 of the base is generally frusto-conical in shape. A slot 15 is formed in the base second end 4.

The present invention further comprises a head and neck 6. The neck 19 of the head and neck 6 is generally solid. However, the neck 19 is hollowed out at the lower neck end 21 with a cavity 23 having a frusto-conical surface. The surface of the cavity 23 matches the frusto-conical surface of the base second end 4. A rectangular slot 25 is formed at the apex of the cavity 23.

A flexible connector 5 is used to connect the head and neck 6 to the base 1. The flexible connector 5 is made from a weatherproof flexible material such as a plastic material. I have found that a nylon wrapping band material approximately 0.40 inches wide and 0.03 inches thick works very well. One end 17 of the flexible connector 5 is inserted into the slot 15 in the base. The flexible connector fits with a snug fit in that slot. A second end 27 of the flexible connector 5 is inserted into the slot 25 in the head and neck cavity 23. The connector second end 27 fits with a snug friction fit in the slot 25. Consequently, the connector can be inserted at varying distances into the slot 25 and the head and neck will remain at the set location relative to the connector and thus relative to the base 1 and the body 2.

In use, the decoy body 2 is placed at any desired hunting location. The base end 13 is inserted into the body hole 11. The flexible connector first end 17 is inserted into the base slot 15. The connector second end 27 is inserted into the head and neck slot 25 for a distance appropriate for the wind conditions at the time. If the wind is light, the connector end 27 is inserted just a slight distance into the slot 25. In heavy air, the connector end 27 is inserted into the full depth of the slot 25. With the proper insertion of the connector, the wind acting on the head and neck causes the connector to bend back and forth and enable the head and neck to move relative to the body in a very realistic way.

Figure 3:
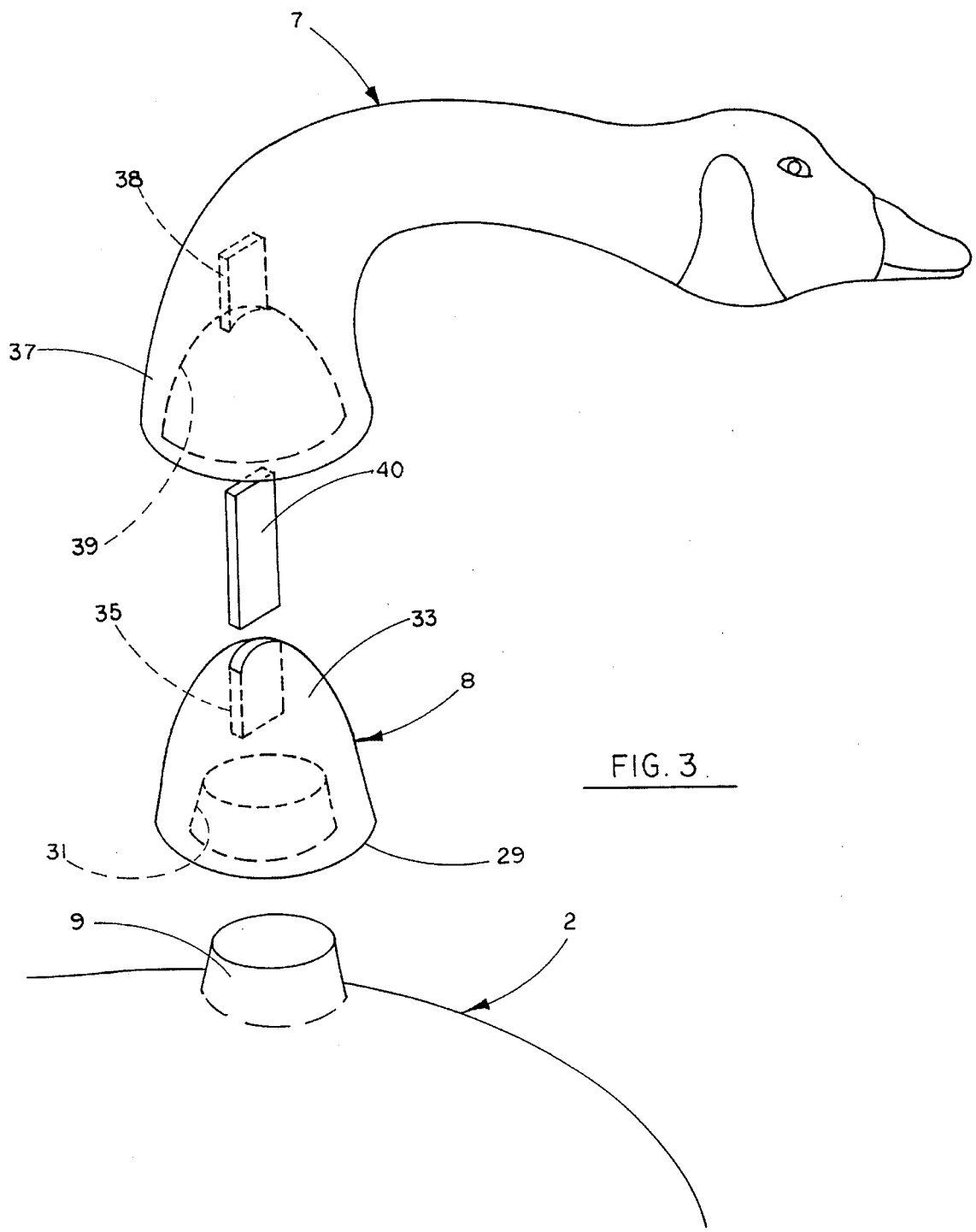
FIG. 3 is a partial perspective view of an alternative base mounting connected to a feeder style head and neck.

A modified embodiment of the invention is shown in FIG. 3. The decoy body 2' has a knob or post 9 rather than a hole. A base 8 has a lower end 29 that has a cavity 31 sized and shaped to fit closely over the body knob 9. The upper end 33 of the base 8 has a frusto-conical surface and a rectangular slot 35. The head and neck 7 has a lower end 37 with a frusto-conical shaped cavity 39. The cavity 39 fits over the frusto-conical surface 33 of the base 8. A rectangular slot 38 is formed in the apex of the cavity 39. A flexible connector 40 is inserted into the base slot 35 and into the head and neck cavity slot 38. The head and neck 7 of FIG. 3 represents a feeder style bird. The feeder style head and neck of FIG. 3 requires a stiffer flexible connector than the sentry style head and neck 6 of FIGS. 1 and 2. A nylon wrapping band approximately 0.50 inches wide and 0.04 inches thick works very well for the feeder style head and neck of FIG. 3. It will be appreciated, of course, that the knob and base design of FIG. 3 can be used with the sentry style head and neck configuration 6 and the flexible connector 5 of FIGS. 1 and 2.

Figure 4:
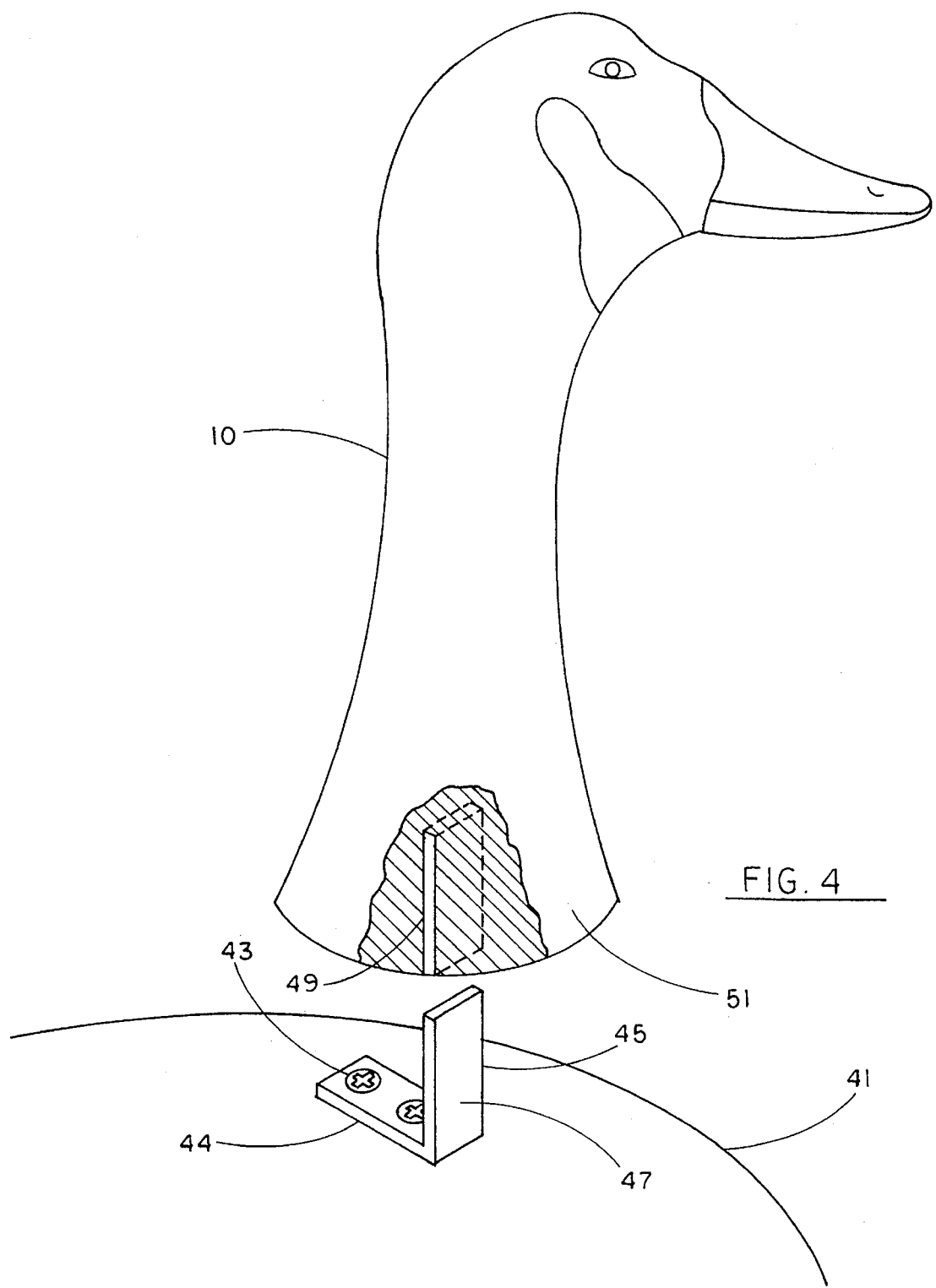
FIG. 4 is an exploded perspective view of a modified embodiment of the invention.

Turning now to FIG. 4, a decoy body 41 has neither a hole like the hole 11 of the body 2 of FIG. 2 nor a knob like the knob 9 of the body 2' of FIG. 3. Rather, the body 41 is generally flat on its upper surface at its front end. Attached to the body 41, as by aluminum screws 43, is one leg 44 of an L-shaped flexible connector 45. The second leg 47 of the connector 45 is generally upright relative to the body. A head and neck 10 has a slot 49 in the neck lower end 51. The slot 49 receives the flexible connector second leg 47 with a snug friction fit. The connector leg 47 is inserted into the head and neck slot 49 for a distance suitable for the wind conditions in a manner substantially similar to that described previously in conjunction with FIGS. 1–3.

Thus, it is apparent that there has been provided, in accordance with the invention, a wind activated decoy head and neck that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A wind activated decoy comprising:
   a. a decoy body having an upper surface that defines a hole;
   b. a base having a first end inserted into the decoy body hole and a second end having a predetermined surface contour that defines a slot therein;
   c. a flexible connector having a first end inserted into the slot in the base second end, and a second end; and
   d. a decoy head and neck having a neck portion with a lower end, the lower end of the neck portion being formed with a slot therein that receives the second end of the flexible connector,
   so that the flexible connector bends when wind blows on the head and neck to thereby produce lifelike movements of the head and neck relative to the body.

2. The wind activated decoy of claim 1 wherein the slot in the decoy head and neck receives the flexible band second end with a snug friction fit that enables the flexible connector second end to be inserted into and retained at varying distances within the head and neck slot,
   so that the amount of bending of the flexible connector can be controlled to suit different wind conditions.

3. The wind activated decoy of claim 1 wherein:
   a. the lower end of the neck portion of the head and neck is formed with a cavity having a surface that conforms to the surface contour of the base second end; and
   b. the slot in the lower end of the neck portion of the head and neck is in the cavity formed at the lower end of the neck portion of the head and neck.

4. The wind activated decoy of claim 1 wherein:
   a. the base second end is formed with a frusto-conical surface contour;

b. the lower end of the neck portion of the decoy head and neck is formed with a cavity having a frusto-conical surface contour that conforms to the frusto-conical surface contour of the base second end; and c. the slot in the lower end of the neck portion of the decoy head and neck is in the cavity therein.

5. A wind activated decoy head and neck comprising:

a. a decoy body having a neck end;

b. a knob upstanding from the decoy body at the neck end thereof;

c. a base having a first end that defines a cavity that fits closely over the knob on the decoy body, and a second end that defines a predetermined surface contour and a slot;

d. a flexible connector having a first end inserted into the slot in the base second end, and a second end; and e. a decoy head and neck having a neck portion with a lower end, the lower end of the neck portion being formed with a slot therein that receives the second end of the flexible connector;

so that the flexible connector bends when wind blows on the decoy head and neck to thereby produce lifelike movements of the decoy head and neck relative to the decoy body.

6. The wind activated decoy head and neck of claim 5 wherein the slot in the decoy head and neck receives the flexible connector second end with a snug friction fit that enables the connector second end to be inserted into and retained at varying distances within the decoy head and neck slot, so that the amount of bending of the flexible connector can be controlled to suit different wind conditions.

7. The wind activated decoy head and neck of claim 5 wherein:

a. the lower end of the neck portion of the decoy head and neck is formed with a cavity having a surface that conforms to the predetermined surface contour of the base second end; and b. the slot in the lower end of the neck portion of the decoy head and neck is in the head and neck cavity.

8. The wind activated decoy head and neck of claim 5 wherein:

a. the base second end defines a frusto-conical surface contour;

b. the lower end of the neck portion of the decoy head and neck is formed with a cavity that defines a frusto-conical surface contour that conforms to the frusto-conical surface contour of the base second end; and c. the slot in the lower end of the neck portion of the decoy head and neck is in the cavity therein.

9. A method of making a bird decoy comprising the steps of:

a. providing a decoy body;

b. providing a decoy head and neck;

c. fastening one leg of a flexible connector to the decoy body; and d. inserting a second leg of the flexible connector into the decoy head and neck, wherein the step of inserting the second leg of the flexible connector into the decoy head and neck comprises the step of inserting the second leg of the connector with a snug friction fit at a selected variable depth into the decoy head and neck to thereby vary the bending of the flexible connector second leg to suit different wind conditions, so that wind acting on the head and neck bends the connector second leg to impart movement of the head and neck relative to the body.

10. A wind activated decoy head and neck comprising:

a. a decoy body;

b. a head and neck having a neck portion with a lower end; and c. connector means interposed between the decoy body and the lower end of the neck portion of the head and neck for bending under wind forces acting on the head and neck to enable the head and neck to move in the wind relative to the decoy body, wherein the connector means comprises:

i. a base having a first end joined to the decoy body, and a second end; and ii. a flexible connector having a first end inserted into the base second end, and a second end inserted into the lower end of the neck portion of the head and neck.

11. The wind activated decoy head and neck of claim 10 wherein the flexible connector is inserted to variable depths into the lower end of the neck portion of the head and neck to thereby enable the head and neck to move realistically in different strength winds.

12. The wind activated decoy head and neck of claim 10 wherein:

a. the base second end defines a generally frusto-conical surface; and b. the lower end of the neck portion of the head and neck is formed with a cavity having a generally frusto-conical surface that conforms to the surface of the base second end.

13. A wind activated decoy head and neck comprising:

a. a decoy body;

b. a head and neck having a neck portion with a lower end; and c. connector means interposed between the decoy body and the lower end of the neck portion of the head and neck for bending under wind forces acting on the head and neck to enable the head and neck to move in the wind relative to the decoy body, wherein the connector means comprises:

i. a knob formed on the decoy body;

ii. a base having a first end that defines a cavity that fits closely over the knob on the decoy body, and a second end; and iii. a flexible connector having a first end inserted into the base second end, and a second end inserted into the lower end of the neck portion of the head and neck.

14. The wind activated decoy head and neck of claim 13 wherein the flexible connector is insertable at variable depths into the lower end of the neck portion of the head and neck to thereby enable the head and neck to move realistically in different strength winds.

15. The wind activated decoy head and neck of claim 13 wherein:

a. the base second end defines a generally frusto-conical surface; and b. the lower end of the neck portion of the head and neck is formed with a cavity having a generally frusto-conical surface that conforms to the surface of the base second end.

16. A wind activated decoy head and neck comprising:

a. a decoy body;

b. a head and neck having a neck portion with a lower end; and c. connector means interposed between the decoy body and the lower end of the neck portion of the head and neck for bending under wind forces acting on the head and neck to enable the head and neck to move in the wind relative to the decoy body, wherein the connector means comprises a generally L-shaped connector having a first leg fastened to the decoy body and a second leg that is inserted into the lower end of the neck portion of the head and neck, and wherein the second leg of the L-shaped connector is insertable at variable depths into the lower end of the neck portion of the head and neck to thereby enable the head and neck to move realistically in different strength winds.

17. A method of luring a bird comprising the steps of:

a. providing a bird decoy body;

b. providing a bird decoy head and neck;

c. joining one end of a base to the decoy body;

d. inserting the first end of a flexible connector into a second end of the base; and e. inserting a second end of the flexible connector into the decoy head and neck, so that the flexible connector bends when the wind blows on the head and neck to thereby impart movement of the head and neck relative to the decoy body.

18. The method of claim 17 wherein the step of inserting the second end of the flexible connector into the decoy head and neck comprises the step of inserting the second end of the connector with a snug friction fit to a selected variable depth into the decoy head and neck to thereby vary the bending of the flexible connector to suit different wind conditions.

* * * * *